United States Patent Office 3,054,657
Patented Sept. 18, 1962

3,054,657
CRYSTALLINE ZEOLITE S
Donald W. Breck, Tonawanda, N.Y., assignor to Union Carbide Corporation, a corporation of New York
No Drawing. Filed Mar. 31, 1958, Ser. No. 724,843
11 Claims. (Cl. 23—113)

This invention relates to a synthetic, crystalline zeolitic sodium aluminosilicate of the molecular sieve type which is useful as an adsorbent and to a method of making the composition.

It is an object of this invention to provide a novel crystalline zeolitic sodium aluminosilicate of the molecular sieve type suitable for use as an adsorbent. Another object of the invention is to provide a method of making the novel adsorbent of the invention. Other objects will be apparent from the subsequent disclosure and appended claims.

Naturally-occurring, crystalline hydrated, metal aluminosilicates are called zeolites.

A number of synthetic crystalline zeolites have been prepared. They are distinguishable from each other, and from the naturally-occurring materials, on the basis of their composition, crystal structure, and adsorption properties. A suitable method for distinguishing these materials, for example, is by their X-ray powder diffraction patterns. The existence of a number of zeolites having similar but distinguishable properties advantageously permits the selection of a particular member having optimum properties for a particular use. The synthetic zeolitic molecular sieve described herein will be designated hereinafter as "zeolite S" to distinguish it from both natural and other synthetic materials.

Certain adsorbents selectively sorb molecules on the basis of the size and shape of the adsorbate molecule, and are called "molecular sieves." Molecular sieves are crystalline metal aluminosilicates which have a sorption area available on the inside of a large number of uniformly sized pores of molecular dimensions. With such an arrangement, molecules of a certain size and shape enter the pores and are adsorbed, while larger or differently-shaped molecules are excluded. Not all adsorbents behave in the manner of molecular sieves. The common adsorbents, charcoal and silica gel, for example, do not exhibit molecular sieve action.

Dehydration of the molecular sieves to effect the loss of the water of hydration results in a crystal interlaced with channels of molecular dimensions that offer very high surface areas for the adsorption of foreign molecules. Factors influencing occlusion by activated zeolite S crystals are the size and polarizing power of the interstitial cation; the polarizability and polarity of the occluded molecules, the dimensions and shape of the sorbed molecule relative to those of the channels, the duration and severity of dehydration and desorption, and the presence of foreign molecules in the interstitial channels. It will be understood that the refusal characteristics of zeolite S are quite as important as the adsorptive or positive adsorption characteristics if effective separations by selective adsorption are to be obtained.

The chemical formula for zeolite S may be written as:

$$0.9 \pm 0.2 Na_2O; Al_2O_3 : W SiO_2 : X H_2O$$

wherein "W" is from 4.6 to 5.9, and "X," for the fully hydrated form is from about 6 to 7.

Zeolite S has a characteristic X-ray powder diffraction pattern which may be employed to identify zeolite S. The X-ray powder diffraction data are shown in Table A. In obtaining the X-ray powder diffraction patterns, standard techniques were employed. The radiation was the K-alpha doublet of copper, and a Geiger counter spectrometer with a strip chart pen recorder was used. The peak heights, I, and the positions as a function of $2\theta$, where $\theta$ is the Bragg angle, were read from the spectrometer chart. From these, the relative intensities, $100\ I/I_0$, where $I_0$ is the intensity of the strongest line or peak, and $d$ (A) observed, the interplanar spacing in Angstrom units, corresponding to the recorded lines were determined.

TABLE A

*X-ray Diffraction Patterns of Synthetic Zeolite S*

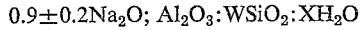

| $d$, A.: | 100 ($I/I$ max.) |
|---|---|
| 11.88 | 77 |
| 7.73 | 19 |
| 7.16 | 100 |
| 5.96 | 9 |
| 5.03 | 72 |
| 4.50 | 46 |
| 4.12 | 79 |
| 3.97 | 20 |
| 3.44 | 62 |
| 3.305 | 13 |
| 3.236 | 23 |
| 2.973 | 80 |
| 2.858 | 47 |
| 2.693 | 19 |
| 2.603 | 39 |
| 2.126 | 11 |
| 2.089 | 39 |
| 1.910 | 12 |
| 1.809 | 40 |
| 1.722 | 32 |

Zeolite S may be prepared by preparing a sodium aluminosilicate-water mixture such that the composition of the reactant mixture, in terms of oxide-mole-ratios, falls within the range shown in Table B when the source of silica is an aqueous colloidal silica sol:

TABLE B

| $Na_2O/SiO_2$ | 0.3 to 0.6 |
|---|---|
| $SiO_2/Al_2O_3$ | 6 to 10 |
| $H_2O/Na_2O$ | 20 to 100 | and falls within the range shown in Table C when the source of silica is sodium silicate:

TABLE C

| $Na_2O/SiO_2$ | About 0.5 |
|---|---|
| $SiO_2/Al_2O_3$ | About 25 |
| $H_2O/Na_2O$ | About 18 | maintaining the mixture at a temperature in the range of from preferably 80° C. up to about 120° C., most suitably at about 100° C., and at a pressure at least equal to the vapor pressure of water in equilibrium with the mixture of reactants until crystals are formed, and separating the crystals from the mother liquor.

Examples of the preparation of typical colloidal silica sols which are suitable for use in one of the preferred forms of the invention are provided in U.S. Patents 2,574,902 and 2,597,872.

The usual method of preparation of the novel adsorbent of the present invention comprises dissolving sodium aluminate and alkali in water and adding this solution to a water solution of sodium silicate or preferably to a water-silicate mixture derived at least in part from an aqueous colloidal silica sol. The resultant mixture is placed in a sealed container to avoid substantial loss of water and heated at a temperature in the broad range of from 25° C. to 150° C. until crystallization occurs. When crystallization is complete the solids are separated from the mother liquor by any suitable means such as suction filtration. Preferably, the crystals are washed with distilled water until the pH of the effluent is about 10 to 11, indicating that the crystals are free from excess alkali. The product, after drying at 100°–110° C., may be identified by chemical analysis and X-ray powder diffraction patterns.

The following examples illustrate the process of the present invention:

EXAMPLE I

Twenty-two grams of sodium hydroxide were added to 322 grams of a sodium silicate solution which contained 0.109 mole $Na_2O$, 0.422 mole $SiO_2$ and 3.76 moles of $H_2O$ per 100 grams. To this solution, all at room temperature, was added ten grams of solid sodium aluminate which contained 0.63 mole $Na_2O$ and 0.56 mole of $Al_2O_3$ per 100 grams. This mixture was heated at 100° C. in sealed glass container for seventeen (17) hours. The supernatant liquid was removed by filtration and the solid residue, a white powder, was washed until free of excess sodium hydroxide. Chemical analysis of this powder, after drying at 100° C. gave the molar composition:

$$0.98Na_2O \cdot Al_2O_3 \cdot 4.59SiO_2 \cdot 6.3H_2O$$

EXAMPLE II

In another preparation, 20.0 grams of sodium aluminate which contained 0.63 mole $Na_2O$ and 0.56 mole of $Al_2O_3$ per 100 grams were added at room temperature to 228.4 grams of an aqueous colloidal silica sol containing 0.49 mole $SiO_2$ and 3.92 moles of $H_2O$ per 100 grams. To this were added 25.6 grams of sodium hydroxide. The mixture was stirred to produce a homogeneous mixture and heated in a sealed glass container at 100° C. Crystallization was evidenced by the formation of a precipitate covered by a clear supernatant solution.

The above products had an X-ray powder diffraction pattern characterized by the data of Table A.

The crystals of this invention are basically three-dimensional frameworks of $SiO_4$ and $AlO_4$ tetrahedra, cross-linked by the sharing of oxygen atoms. The electrovalence of each tetrahedron containing aluminum is balanced by the presence of sodium cations. The void spaces in the framework are occupied by water molecules.

The crystals may be activated by heating in such a manner as to effect the loss of the water of hydration. Such dehydration may be effected by standard techniques such as heating under vacuum at about 350° C. or heating in a purge gas such as air. This leaves a crystal structure interlaced with channels of molecular dimensions offering very high surface area for the adsorption of foreign molecules.

Zeolite S exhibits a selectivity for polar adsorbates, with high capacity even at low relative concentrations.

The novel material of this invention may be utilized as a selective adsorbent in numerous gas or liquid separation processes. Small, polar molecules, particularly water, sulfur dioxide and ammonia may be separated from mixtures with less polar materials. Additionally, zeolite S distinguishes between molecules on the basis of their size and shape, preferentially adsorbing the smaller molecules and rejecting the larger ones. The zeolite may also find use in cyclic adsorption-desorption processes for water, and other adsorbates. Zeolite S can also adsorb oxygen at low temperatures.

The unique adsorption characteristics of zeolite S are illustrated by the data of Table D. These data were obtained as follows:

Samples of zeolite S which had been activated by dehydration at a temperature of approximately 350° C., under vacuum, were tested to determine their adsorption properties. The adsorption properties were measured in a McBain adsorptive system. The zeolite samples were placed in light aluminum buckets suspended from quartz springs. They were activated in situ, and the gas or vapor under test was then admitted to the system. The gain in weight of the adsorbent was measured by the spring extensions as read by a cathetometer. In Table D the pressure given for each adsorption is the pressure of the adsorbate. The term "Weight-Percent Adsorbed" refers to the percentage increase in the weight of the activated adsorbent.

TABLE D

*Adsorptive Properties of Activated Synthetic Zeolite S*

| Adsorbate | Pressure, mm. Hg | Temperature, ° C. | Weight-Percent Adsorbed |
|---|---|---|---|
| Water | .012 | 25 | 10.4 |
| | .076 | 25 | 15.2 |
| | 4.5 | 25 | 21.5 |
| | 24 | 25 | 28.0 |
| | 2 | 100 | 2.8 |
| | 4.5 | 100 | 4.2 |
| | 14 | 100 | 11.2 |
| | 22 | 100 | 13.4 |
| Argon | 1.8 | −196 | 4.7 |
| | 24 | −196 | 7.8 |
| | 130 | −196 | 9.0 |
| Carbon dioxide | 6 | 25 | 5.4 |
| | 24 | 25 | 8.7 |
| | 100 | 25 | 11.7 |
| | 700 | 25 | 13.9 |
| Nitrogen | .110 | −196 | 4.4 |
| | 8.5 | −196 | 4.7 |
| | 700 | −196 | 6.2 |
| | 700 | −78 | 2.5 |
| Propane | 700 | 25 | 2.9 |
| Propylene | 700 | 25 | 4.7 |
| Benzene | 65 | 25 | <1 |
| Ammonia | .5 | 25 | 5.5 |
| | 46 | 25 | 7.7 |
| | 700 | 25 | 9.4 |
| Sulfur dioxide | .02 | 25 | 7.5 |
| | 7 | 25 | 16.1 |
| | 100 | 25 | 18 |
| | 700 | 25 | 21.2 |
| Oxygen | 140 | −196 | 4.9 |
| Krypton | 18 | −183 | 5.5 |
| n-pentane | 404 | 25 [1] | 1.3 |

[1] Plus 50° C.

The desorption of adsorbed materials from zeolite S may be effected by washing with water or steam, by purging with gas while holding the material at an elevated temperature, or by evacuation, or similar techniques.

Zeolite S may be used as an adsorbent in any suitable form. Powdered crystalline material gives excellent results as do pelleted forms. The pelleted forms may be obtained by pressing into pellets a mixture of zeolite S and a suitable bonding agent such as clay.

The density of a typical zeolite S composition is 2.08 grams per cc. when fully hydrated. Zeolite S crystals prepared by the process described herein average about 2 to 5 microns in diameter.

What is claimed is:

1. A synthetic, crystalline, zeolitic sodium aluminosilicate of the molecular sieve type having a composition, expressed in terms of oxides, as follows:

$$0.9 \pm 0.2Na_2O : Al_2O_3 : WSiO_2 : XH_2O$$

wherein "W" is a value in the range of from 4.6 to 5.9 and "X," in the fully hydrated form, is a value in the range of from about 6 to about 7, said sodium aluminosilicate having an X-ray powder diffraction pattern essentially the same as that shown in Table A

TABLE A

*X-ray Diffraction Patterns of Synthetic Zeolite S*

[$d$=interplanar spacing in A.: $I/I$ max.=relative intensity]

| $d$, A.: | 100 ($I/I$ max.) |
|---|---|
| 11.88 | 77 |
| 7.73 | 19 |
| 7.16 | 100 |
| 5.96 | 9 |
| 5.03 | 72 |
| 4.50 | 46 |
| 4.12 | 79 |
| 3.97 | 20 |
| 3.44 | 62 |
| 3.305 | 13 |
| 3.236 | 23 |

| d, A.: | 100 (I/I max.) |
|---|---|
| 2.973 | 80 |
| 2.858 | 47 |
| 2.693 | 19 |
| 2.603 | 39 |
| 2.126 | 11 |
| 2.089 | 39 |
| 1.910 | 12 |
| 1.809 | 40 |
| 1.722 | 32 |

2. A method for preparing a synthetic, crystalline, zeolitic sodium aluminosilicate of the molecular sieve type having a composition, expressed in terms of oxides, as follows:

$$0.9\pm0.2Na_2O:Al_2O_3:WSiO:XH_2O$$

wherein "W" is a value in the range of from 4.6 to 5.9 and "X," in the fully hydrated form, is a value in the range of from about 6 to about 7, said sodium aluminosilicate having an X-ray powder diffraction pattern essentially the same as that shown in Table A

TABLE A

*X-ray Diffraction Patterns of Synthetic Zeolite S*

[d=interplanar spacing in A.: I/I max.=relative intensity]

| d, A.: | 100 (I/I max.) |
|---|---|
| 11.88 | 77 |
| 7.73 | 19 |
| 7.16 | 100 |
| 5.96 | 9 |
| 5.03 | 72 |
| 4.50 | 46 |
| 4.12 | 79 |
| 3.97 | 20 |
| 3.44 | 62 |
| 3.305 | 13 |
| 3.236 | 23 |
| 2.973 | 80 |
| 2.858 | 47 |
| 2.693 | 19 |
| 2.603 | 39 |
| 2.126 | 11 |
| 2.089 | 39 |
| 1.910 | 12 |
| 1.809 | 40 |
| 1.722 | 32 | which comprises preparing a sodium aluminosilicate-water mixture such that the composition of the reactant mixture, in terms of oxide-mole-ratios, falls within the range shown in Table B when the source of silica is an aqueous colloidal silica sol:

TABLE B

| $Na_2O/SiO$ | 0.3 to 0.6 |
|---|---|
| $SiO_2/Al_2O_3$ | 6 to 10 |
| $H_2O/Na_2O$ | 20 to 100 | maintaining the mixture at a temperature in the range of from about 80° C. up to about 120° C., and at a pressure at least equal to the vapor pressure of water in equilibrium with the mixture of reactants until crystals are formed, and separating the crystals from the mother liquor.

3. A method according to claim 2 for preparing a synthetic, crystalline, molecular sieve wherein said mixture is maintained at about 100° C.

4. A method for preparing a synthetic, crystalline zeolite which comprises preparing a sodium aluminosilicate-water mixture such that the composition of the reactant mixture, in terms of oxide-mole-ratios, is as shown in Table C when the source of silica is sodium silicate:

TABLE C

| $Na_2O/SiO$ | About 0.5 |
|---|---|
| $SiO_2/Al_2O_3$ | About 25 |
| $H_2O/Na_2O$ | About 18 | maintaining said reactant mixture at a temperature of 100° C. until crystals are formed which have the composition $$0.98Na_2O\cdot Al_2O_3\cdot 4.59SiO_2\cdot 6.3H_2O$$

and which has an X-ray diffraction pattern as shown in Table A

TABLE A

*X-ray Diffraction Patterns of Synthetic Zeolite S*

[d=interplanar spacing in A.: I/I max.=relative intensity]

| d, A.: | 100 (I/I max.) |
|---|---|
| 11.88 | 77 |
| 7.73 | 19 |
| 7.16 | 100 |
| 5.96 | 9 |
| 5.03 | 72 |
| 4.50 | 46 |
| 4.12 | 79 |
| 3.97 | 20 |
| 3.44 | 62 |
| 3.305 | 13 |
| 3.236 | 23 |
| 2.973 | 80 |
| 2.858 | 47 |
| 2.693 | 19 |
| 2.603 | 39 |
| 2.126 | 11 |
| 2.089 | 39 |
| 1.910 | 12 |
| 1.809 | 40 |
| 1.722 | 32 | and separating the crystals from the mother liquor.

5. A method for preparing a synthetic, crystalline, zeolitic sodium aluminosilicate of the molecular sieve type having a composition, expressed in terms of oxides, as follows:

$$0.9\pm0.2Na_2O:Al_2O_3:WSiO_2:XH_2O$$

wherein "W" is a value in the range of from 4.6 to 5.9 and "X," in the fully hydrated form, is a value in the range of from about 6 to about 7, said sodium aluminosilicate having an X-ray powder diffraction pattern essentially the same as that shown in Table A

TABLE A

*X-ray Diffraction Patterns of Synthetic Zeolite S*

[d=interplanar spacing in A.: I/I max.=relative intensity]

| d, A.: | 100 (I/I max.) |
|---|---|
| 11.88 | 77 |
| 7.73 | 19 |
| 7.16 | 100 |
| 5.96 | 9 |
| 5.03 | 72 |
| 4.50 | 46 |
| 4.12 | 79 |
| 3.97 | 20 |
| 3.44 | 62 |
| 3.305 | 13 |
| 3.236 | 23 |
| 2.973 | 80 |
| 2.858 | 47 |
| 2.693 | 19 |
| 2.603 | 39 |
| 2.126 | 11 |
| 2.089 | 39 |
| 1.910 | 12 |
| 1.809 | 40 |
| 1.722 | 32 | which comprises preparing a sodium aluminosilicate-water mixture such that the composition of the reactant mixture, in terms of oxide-mole-ratios, falls within the range shown in Table C when the source of silica is sodium silicate:

TABLE C

Na$_2$O/SiO$_2$ _____ About 0.5
SiO$_2$/Al$_2$O$_3$ _____ About 25
H$_2$O/Na$_2$O _____ About 18 maintaining the mixture at a temperature in the range of from about 80° C. up to about 120° C., and at a pressure at least equal to the vapor pressure of water in equilibrium with the mixture of reactants until crystals are formed, and separating the crysals from the mother liquor.

6. A method for preparing a synthetic, crystalline, zeolitic sodium aluminosilicate of the molecular sieve type having a composition, expressed in terms of oxides, as follows:

$$0.9 \pm 0.2\text{Na}_2\text{O}:\text{Al}_2\text{O}_3:\text{WSiO}_2:\text{XH}_2\text{O}$$

wherein "W" is a value in the range of from 4.6 up to 5.9 and "X," in the fully hydrated form, is a value in the range of from about 6 to about 7, said sodium aluminosilicate having an X-ray powder diffraction pattern essentially the same as that shown in Table A

TABLE A

X-ray Diffraction Patterns of Synthetic Zeolite S

[$d$ = interplanar spacing in A. : $I/I$ max. = relative intensity]

$d$, A.:                                                 100 ($I/I$ max.)

11.88 _____ 77
7.73 _____ 19
7.16 _____ 100
5.96 _____ 9
5.03 _____ 72
4.50 _____ 46
4.12 _____ 79
3.97 _____ 20
3.44 _____ 62
3.305 _____ 13
3.236 _____ 23
2.973 _____ 80
2.858 _____ 47
2.693 _____ 19
2.603 _____ 39
2.126 _____ 11
2.089 _____ 39
1.910 _____ 12
1.809 _____ 40
1.722 _____ 32 which comprises preparing a sodium aluminosilicate-water mixture such that the composition of the reactant mixture, in terms of oxide-mole-ratios, falls within the range shown in Table B when the source of silica is an aqueous colloidal silica sol:

TABLE B

Na$_2$O/SiO$_2$ _____ 0.3 to 0.6
SiO$_2$/Al$_2$O$_3$ _____ 6 to 10
H$_2$O/Na$_2$O _____ 20 to 100 maintaining the mixture at a temperature in the range from about 25° C. up to about 150° C., and at a pressure at least equal to the vapor pressure of water in equilibrium with the mixture of reactants until crystals are formed, and separating the crystals from the mother liquor.

7. A method for preparing a synthetic, crystalline, zeolitic sodium aluminosilicate of the molecular sieve type having a composition, expressed in terms of oxides, as follows:

$$0.9 \pm 0.2\text{Na}_2\text{O}:\text{Al}_2\text{O}_3:\text{WSiO}_2:\text{XH}_2\text{O}$$

wherein "W" is a value in the range of from 4.6 up to 5.9 and "X," in the fully hydrated form, is a value in the range of from about 6 to about 7, said sodium aluminosilicate having an X-ray powder diffraction pattern essentially the same as that shown in Table A

TABLE A

X-ray Diffraction Patterns of Synthetic Zeolite S

[$d$ = interplanar spacing in A. : $I/I$ max. = relative intensity]

$d$, A.:                                                 100 ($I/I$ max.)

11.88 _____ 77
7.73 _____ 19
7.16 _____ 100
5.96 _____ 9
5.03 _____ 72
4.50 _____ 46
4.12 _____ 79
3.97 _____ 20
3.44 _____ 62
3.305 _____ 13
3.236 _____ 23
2.973 _____ 80
2.858 _____ 47
2.693 _____ 19
2.603 _____ 39
2.126 _____ 11
2.089 _____ 39
1.910 _____ 12
1.809 _____ 40
1.722 _____ 32 which comprises preparing a sodium aluminosilicate-water mixture such that the composition of the reactant mixture, in terms of oxide-mole-ratios, falls within the range shown in Table C when the source of silica is sodium silicate:

TABLE C

Na$_2$O/SiO$_2$ _____ About 0.5
SiO$_2$/Al$_2$O$_3$ _____ About 25
H$_2$O/Na$_2$O _____ About 18 maintaining the mixture at a temperature in the range from about 25° C. up to about 150° C., and at a pressure at least equal to the vapor pressure of water in equilibrium with the mixture of reactants until crystals are formed, and separating the crystals from the mother liquor.

8. A method according to claim 5 for preparing a synthetic, crystalline, molecular sieve wherein said mixture is maintained at about 100° C.

9. A method according to claim 6 wherein said crystals are dehydrated at a temperature of about 350° C.

10. A method according to claim 7 wherein said crystals are dehydrated at a temperature of about 350° C.

11. A synthetic, crystalline, zeolitic sodium aluminosilicate of the molecular sieve type having a composition, expressed in terms of oxides, as follows:

$$0.98\text{Na}_2\text{O}:\text{Al}_2\text{O}_3:4.59\text{SiO}_2:6.3\text{H}_2\text{O}$$

said sodium aluminosilicate having an X-ray powder diffraction pattern essentially the same as that shown in Table A:

TABLE A

X-Ray Diffraction Patterns of Synthetic Zeolite S

[$d$ = interplanar spacing in A. : $I/I$ max. = relative intensity]

$d$, A.:                                                 100 ($I/I$ max.)

11.88 _____ 77
7.73 _____ 19
7.16 _____ 100
5.96 _____ 9
5.03 _____ 72
4.50 _____ 46
4.12 _____ 79
3.97 _____ 20
3.44 _____ 62
3.305 _____ 13

| $d$, A.: | 100 ($I/I$ max.) |
|---|---|
| 3.236 | 23 |
| 2.973 | 80 |
| 2.858 | 47 |
| 2.693 | 19 |
| 2.603 | 39 |
| 2.126 | 11 |
| 2.089 | 39 |
| 1.910 | 12 |
| 1.809 | 40 |
| 1.722 | 32 |

References Cited in the file of this patent

UNITED STATES PATENTS

| | | |
|---|---|---|
| 2,306,610 | Barrer | Dec. 29, 1942 |
| 2,413,134 | Barrer | Dec. 24, 1946 |
| 2,841,471 | Sensel | July 1, 1958 |
| 2,847,280 | Estes | Aug. 12, 1958 |
| 2,865,867 | Van Dyke et al. | Dec. 23, 1958 |
| 2,882,244 | Milton | Apr. 14, 1959 |
| 2,904,607 | Mattox et al. | Sept. 15, 1959 |

FOREIGN PATENTS

| | | |
|---|---|---|
| 574,911 | Great Britain | Jan. 25, 1946 |
| 777,233 | Great Britain | June 19, 1957 |
| 1,151,287 | France | Aug. 19, 1957 |

OTHER REFERENCES

Mellor: Comprehensive Treatise on Inorganic and Theoretical Chemistry, vol. 6, pp. 574–579, Longmans, Green and Co., N.Y., 1925.

Synthesis of Zeolitic Mineral, Barrer, Chemical Society Journal, London, 1948, pp. 127–143.

Barrier et al.: The Hydrothermal Chemistry of Silicates, Part II, Journal of Chemical Society, 1952, pp. 1561–1573.